United States Patent
Hayashi

(10) Patent No.: US 7,372,775 B2
(45) Date of Patent: May 13, 2008

(54) ULTRASONIC TRANSMITTER, ULTRASONIC TRANSCEIVER AND SOUNDING APPARATUS

(75) Inventor: Tatsuo Hayashi, Nishinomiya (JP)

(73) Assignee: Furuno Electric Company, Limited., Nishinomiya-Shi (JP)

( * ) Notice: Subject to any disclaimer, the term of this patent is extended or adjusted under 35 U.S.C. 154(b) by 177 days.

(21) Appl. No.: 10/855,481

(22) Filed: May 28, 2004

(65) Prior Publication Data
US 2004/0240628 A1    Dec. 2, 2004

(30) Foreign Application Priority Data
May 29, 2003  (JP) .............................. 2003-152620

(51) Int. Cl.
*H04B 1/02* (2006.01)
*G01S 7/52* (2006.01)

(52) U.S. Cl. ....................... 367/138; 367/137; 600/447

(58) Field of Classification Search ................ 367/137, 367/138; 600/447
See application file for complete search history.

(56) References Cited

U.S. PATENT DOCUMENTS

| 4,027,280 | A | * | 5/1977 | Beyers, Jr. .................. 367/137 |
| 4,271,705 | A | | 6/1981 | Crostack et al. |
| 4,353,123 | A | | 10/1982 | Rost et al. |
| 4,937,767 | A | * | 6/1990 | Reuschel et al. ........... 367/138 |
| 5,808,967 | A | * | 9/1998 | Yu et al. ...................... 367/138 |
| 6,117,082 | A | * | 9/2000 | Bradley et al. .............. 600/447 |
| 6,157,593 | A | | 12/2000 | Costa et al. |
| 6,243,323 | B1 | | 6/2001 | Li |
| 2003/0081505 | A1 | | 5/2003 | Malik et al. |

FOREIGN PATENT DOCUMENTS

| GB | 2 395 788 A | 6/2004 |
| GB | 0411079.7 | 6/2004 |
| GB | 2395788 | 6/2004 |
| JP | 2003-202370 A | 7/2003 |

* cited by examiner

*Primary Examiner*—Ian J. Lobo
(74) *Attorney, Agent, or Firm*—Birch, Stewart, Kolasch & Birch, LLP

(57) ABSTRACT

A driver circuit for generating a driving pulse signal to activate a vibrating element includes a half-bridge circuit formed essentially of first and second switching devices to which drive signals are supplied through a driver interface. A driving voltage is supplied to a source of the first switching device, a drain of the second switching device is grounded, and an output terminal of the half-bridge circuit is connected to the vibrating element. The half-bridge circuit is controlled such that the two switching devices alternately turn ON. When the first switching device is ON, the driving voltage is supplied as the driving pulse signal to the vibrating element, and when the second switching device is ON, the vibrating element and the second switching device together form a low-impedance closed loop. As the switching devices are caused to alternately turn ON at specific intervals, the vibrating element vibrates at a natural resonant frequency, transmitting thereby an ultrasonic signal.

6 Claims, 10 Drawing Sheets

FIG.7A FET₁₁ (PRIOR ART)
FIG.7B FET₁₂ (PRIOR ART)
FIG.7C FET₂₁ (PRIOR ART)
FIG.7D FET₂₂ (PRIOR ART)
FIG.7E PULSE SIGNAL (PRIOR ART)

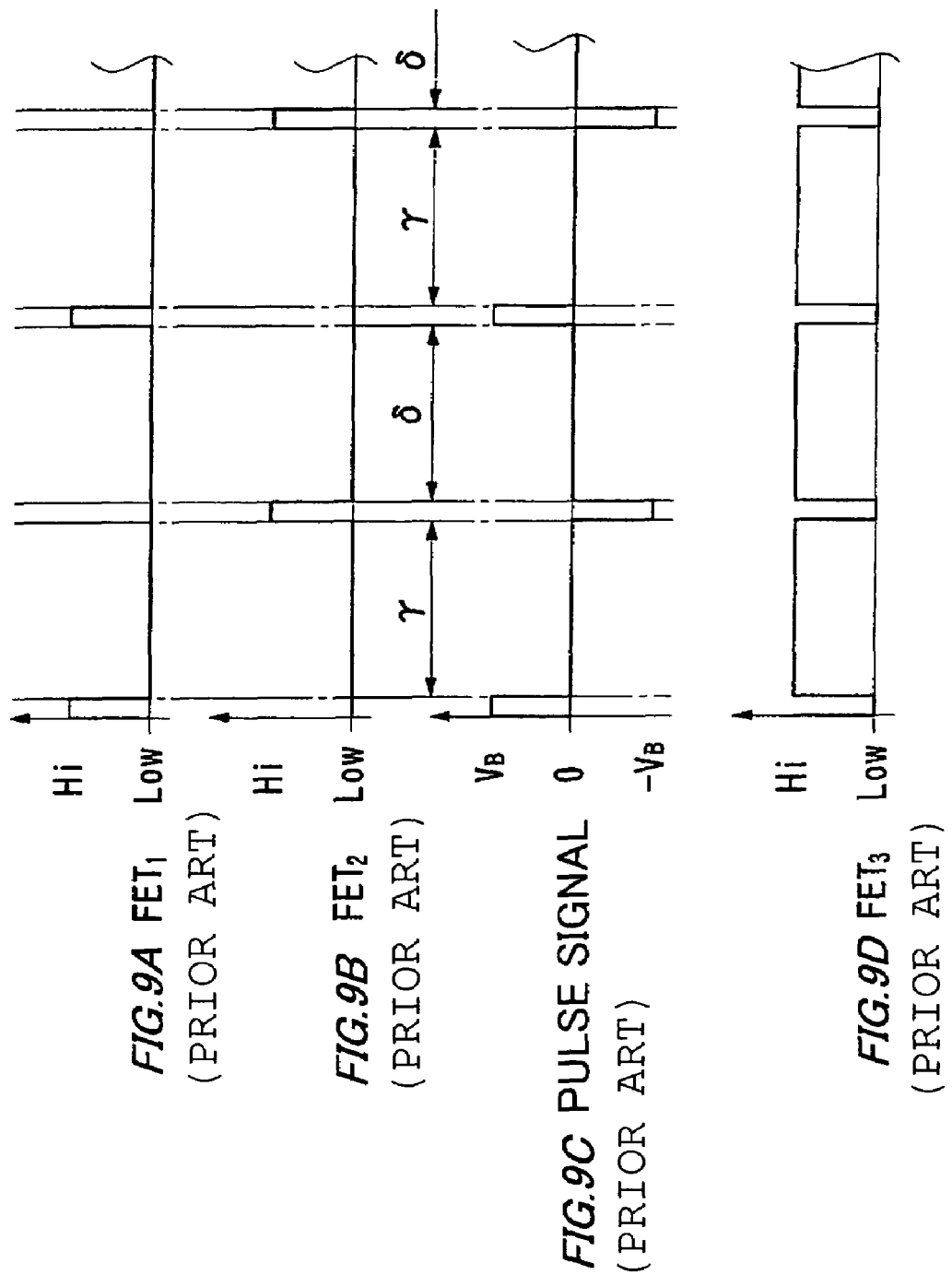
FIG.9A FET₁ (PRIOR ART)
FIG.9B FET₂ (PRIOR ART)
FIG.9C PULSE SIGNAL (PRIOR ART)
FIG.9D FET₃ (PRIOR ART)

ULTRASONIC TRANSMITTER, ULTRASONIC TRANSCEIVER AND SOUNDING APPARATUS

This Non-provisional application claims priority under 35 U.S.C. 119(a) on Patent Application No(s). 2003-152620 filed in Japan on May 29, 2003, the entire contents of which are hereby incorporated by reference.

BACKGROUND OF THE INVENTION

1. Field of the Invention

The present invention relates to an ultrasonic transmitter for radiating ultrasonic waves, an ultrasonic transceiver for radiating ultrasonic waves and receiving echoes of the radiated ultrasonic waves, and a sounding apparatus including an ultrasonic transceiver for detecting objects using ultrasonic waves.

2. Description of the Related Art

Today, sonar apparatuses, such as scanning sonars, are widely used for detecting underwater objects (targets). A scanning sonar for detecting underwater objects in all surrounding directions has a generally cylindrical transducer. The scanning sonar forms an ultrasonic transmitting beam oriented in all directions around the transducer by activating vibrating elements arranged on a cylindrical surface of the transducer. Also, the scanning sonar forms a receiving beam oriented in a particular horizontal direction using a specific number of vertically arranged sets, or columns, of vibrating elements centered on that horizontal direction. Typically, this receiving beam is rotated around the transducer to detect underwater objects in a full-circle area by successively switching the columns of vibrating elements.

It is occasionally necessary for ultrasonic transceivers of scanning sonars of the aforementioned type to control the output power, or amplitude, of ultrasonic waves to prevent mutual interference of the ultrasonic waves between nearby ships which are equipped with the scanning sonars. If the scanning sonar is of a type that radiates ultrasonic waves from a transducer having a plurality of vibrating elements, arranged on the surface of the transducer as stated above, it is also necessary to suppress side lobes of the transmitting beam formed by the transducer (or a combination of the arranged vibrating elements). To achieve this, the ultrasonic transceiver should precisely control driving signals fed into the vibrating elements to control the amplitude of ultrasonic signals radiated from the individual vibrating elements.

Generally, a power amplifier of a transmitter section of the ultrasonic transceiver employs bridge circuits in a final stage, each of the bridge circuits including a plurality of switching devices. The ultrasonic transceiver generates pulse signals for driving the individual vibrating elements by alternately activating the switching devices of the bridge circuits to. The pulse signals cause the vibrating elements to oscillate and thereby radiate ultrasonic signals from the transducer as described in Japanese Patent Application No. 2001-401798, for example.

Two types of bridge circuits are conventionally used in sonar apparatuses. These include a full-bridge circuit using four switching devices and a half-bridge circuit using two switching devices.

FIG. 6 is a general circuit diagram showing an example of a full-bridge circuit, in which field effect transistors (FETs) are used as switching devices.

As shown in FIG. 6, the full-bridge circuit includes a series circuit made up of two switching devices $FET_{11}$, $FET_{12}$ and another series circuit made up of two switching devices $FET_{21}$, $FET_{22}$, the two series circuits being connected parallel to each other between a driving voltage $V_B$ fed from a power supply and ground potential, associated with a vibrating element XD of which both terminals are connected between a joint of the two switching devices $FET_{11}$, $FET_{12}$ and a joint of the two switching devices $FET_{21}$, $FET_{22}$.

ON/OFF states of the switching devices $FET_{11}$, $FET_{12}$, $FET_{21}$, $FET_{22}$ are controlled by entering drive signals shown in FIGS. 7A to 7D into the individual switching devices $FET_{11}$, $FET_{12}$, $FET_{21}$, $FET_{22}$. As a result, the full-bridge circuit supplies a pulse signal shown in FIG. 7E, thereby causing the vibrating element XD to oscillate at its natural resonant frequency. More specifically, when the switching devices $FET_{11}$, $FET_{21}$ supply a pulse to the vibrating element XD, the vibrating element XD is caused to resonate and produce free vibration. The vibrating element XD maintains this free vibration even when no input pulse is supplied. Pulses are successively supplied to the vibrating element XD in a controlled fashion to synchronize ON/OFF timings of the switching devices $FET_{11}$, $FET_{22}$ and the switching devices $FET_{12}$, $FET_{21}$ such that the switching devices $FET_{11}$, $FET_{22}$ and the switching devices $FET_{12}$, $FET_{21}$ are alternately turned to the ON state with a delay time corresponding to half the period of oscillation of the vibrating element XD (or the reciprocal of the natural resonant frequency of the vibrating element XD). Driven in this way, the vibrating element XD continuously vibrates and radiates an ultrasonic signal having a specific amplitude, in which the amount of attenuation of free vibration is compensated for by the successively input pulses. The amplitude of the ultrasonic signal radiated from the vibrating element XD is controlled by regulating the pulselength of the pulse signal so that the vibrating element XD radiates the ultrasonic signal of a desired amplitude.

In the full-bridge circuit thus configured, a closed loop formed by the vibrating element XD and the switching devices $FET_{12}$, $FET_{21}$ has an extremely large impedance if the switching devices $FET_{12}$, $FET_{21}$ are in the OFF state when no driving voltage is supplied to the vibrating element XD from the switching devices $FET_{11}$, $FET_{21}$, or when the switching devices $FET_{11}$, $FET_{21}$ are in the OFF state. When increasing the amplitude of the ultrasonic signal radiated from the vibrating element XD, the pulselength of the pulse signal fed into the vibrating element XD should be increased. If the pulselength of the pulse signal is increased for this reason, periods during which all of the switching devices $FET_{11}$, $FET_{12}$, $FET_{21}$, $FET_{22}$ are set to the OFF state (i.e., durations α and β shown in FIGS. 7A-7E) are shortened so that the amount of attenuation of vibration of the vibrating element XD becomes relatively small. When decreasing the amplitude of the ultrasonic signal radiated from the vibrating element XD, on the contrary, the pulselength of the pulse signal fed into the vibrating element XD should be decreased. If the pulselength of the pulse signal is decreased for this reason, periods during which all of the switching devices $FET_{11}$, $FET_{12}$, $FET_{21}$, $FET_{22}$ are set to the OFF state become longer. In this case, time durations during which the closed loop formed by the full-bridge circuit and the vibrating element XD exhibits an extremely large impedance lengthen and the free vibration of the vibrating element XD is limited. Consequently, the vibration of the vibrating element XD is extremely attenuated and, when the vibrating element XD continuously radiates ultrasonic waves at a decreased amplitude, power loss increases resulting in deterioration of efficiency. If the vibrating element XD stops to vibrate before a succeeding driving pulse is fed into the vibrating element XD due to an extremely large amount of attenuation of vibration, the vibrating element XD would no longer be able to continuously transmit the ultrasonic signal.

The aforementioned problem could also occur in conventional half-bridge circuits. FIG. 8 is a general circuit diagram showing an example of a conventional half-bridge circuit.

As shown in FIG. 8, the half-bridge circuit is configured by a pair of series-connected switching devices $FET_1$, $FET_2$ which are connected between a power source supplying a positive driving voltage $V_B$ and a power source supplying a negative driving voltage $-V_B$, and a switching device $FET_3$ connected parallel to a vibrating element XD of which one terminal is connected to a joint of the two switching devices $FET_1$, $FET_2$.

As drive signals shown in FIGS. 9A and 9B are input into the individual switching devices $FET_1$, $FET_2$, the aforementioned half-bridge circuit causes the vibrating element XD to vibrate at its natural resonant frequency. In an ordinary half-bridge circuit in which the switching device $FET_3$ is always OFF, or a half-bridge circuit including two switching devices $FET_1$, $FET_2$ and not any switching device $FET_3$, there occurs periods of time when both of the switching devices $FET_1$, $FET_2$ are OFF. Particularly when the pulselength of ultrasonic pulses is reduced to lower the amplitude of the ultrasonic signal emitted from the vibrating element XD, periods during which both of the switching devices $FET_1$, $FET_2$ are set to the OFF state (i.e., durations $\gamma$ and $\delta$ shown in FIGS. 9A-9D) lengthen, so that time durations during which a closed loop formed by the vibrating element XD and the half-bridge circuit exhibits an extremely large impedance lengthen and the free vibration of the vibrating element XD is limited. Consequently, as is the case with the aforementioned full-bridge circuit, the vibration of the vibrating element XD is extremely attenuated and, when the vibrating element XD continuously radiates ultrasonic waves at a decreased amplitude, power loss increases resulting in deterioration of efficiency.

To avoid this inconvenience of the ordinary half-bridge circuit, the conventional half-bridge circuit of FIG. 8 is provided with the switching device $FET_3$ connected parallel to a load (the vibrating element XD). As will be recognized from the circuit diagram of FIG. 8, the half-bridge circuit is controlled in such a manner that the switching device $FET_3$ becomes ON when both of the switching devices $FET_1$, $FET_2$ are in the OFF state. As a result, the impedance of a closed loop formed by the vibrating element XD, the switching device $FET_3$ and the half-bridge circuit is lowered so that the vibrating element XD can maintain free vibration with reduced loss and continuously transmit the ultrasonic signal.

The conventional half-bridge circuit thus configured, however, still has a problem in that the provision of the switching device $FET_3$ connected parallel to the vibrating element XD results in a complex circuit configuration.

SUMMARY OF THE INVENTION

It is an object of the invention to provide an ultrasonic transmitter which can transmit ultrasonic waves at high efficiency with a simple construction by driving each vibrating element with a pulse signal using a half-bridge circuit or a full-bridge circuit including a plurality of switching devices. It is a further object of the invention to provide an ultrasonic transceiver employing such an ultrasonic transmitter as well as a sounding apparatus employing such an ultrasonic transceiver.

According to the invention, an ultrasonic transmitter has a transmitting beamformer which includes a drive signal generator for generating drive signals to be fed into a half-bridge circuit. The drive signals generated by the drive signal generator set a second switching device of the half-bridge circuit to an OFF state throughout a period when a first switching device of the half-bridge circuit is in an ON state, and the drive signals generated by the drive signal generator set the second switching device to the ON state throughout a period when the first switching device is in the OFF state.

When the first switching device of the half-bridge circuit is set to the ON state and the second switching device of the half-bridge circuit is set to the OFF state, the first switching device of the half-bridge circuit and a relevant vibrating element together constitute a closed loop. In this case, a driving pulse signal having a specific voltage (or amplitude) and a pulselength corresponding to the duration of the ON state of the first switching device is supplied to the vibrating element throughout the period of time during which the aforementioned condition (the first and second switching devices are set to the ON and OFF states, respectively) is maintained. Contrary to this, when the first switching device is set to the OFF state and the second switching device is set to the ON state, the second switching device and the vibrating element together constitute a low-impedance closed loop resonant circuit throughout the period of time during which the aforementioned condition (the first and second switching devices are set to the OFF and ON states, respectively) is maintained.

The aforementioned combination of the half-bridge circuit and the vibrating element equivalently constitutes a resonant circuit including a switch SW shown in FIG. 10A. The first switching device of the half-bridge circuit is in the ON state and the second switching device of the same is in the OFF state when the switch SW of this resonant circuit is connected to a terminal A (FIG. 10A). When the switch SW is connected to a terminal B, on the other hand, the first switching device is in the OFF state and the second switching device is in the ON state. As depicted in FIG. 10A, the vibrating element is equivalently represented by a series circuit made up of a coil L, a resistor R and a capacitor C.

Once the switch SW is connected to the terminal A, a specific voltage is supplied from a power source V, and when the switch SW is connected to the terminal B, the resonant circuit becomes a series-connected resonant circuit made up of the vibrating element alone. With this circuit configuration, there occurs a damped oscillation, or a gradual decrease in the vibration of the vibrating element at the natural resonant frequency as shown in FIG. 10B, the vibration having the aforementioned natural resonant frequency and a specific initial amplitude and damping characteristics.

According to the invention, the driving pulse signal is supplied to the vibrating element by activating the half-bridge circuit to cause the vibrating element to resonate and produce free vibration at the natural resonant frequency, so that the vibration of the vibrating element is maintained even during periods when no pulses are supplied to the vibrating element. Furthermore, timing at which the first switching device turns on is synchronized with the vibration of the vibrating element so that a driving voltage is continuously supplied to the vibrating element through the first switching device, allowing the vibrating element to continuously vibrate at a specific amplitude and radiate an ultrasonic signal.

Since the amplitude of the radiated ultrasonic signal is determined by the pulselength of the driving pulse signal supplied to the vibrating element, it is possible to control the amplitude of the ultrasonic signal output from the vibrating element by making the pulselength of the driving pulse signal variable. Multiple vibrating elements arranged on an outer surface of a transducer together form an ultrasonic transmitting beam oriented in a particular direction by controlling the amplitude of the ultrasonic signal output from each vibrating element in the aforementioned manner to give desired weights to the individual vibrating elements.

Another ultrasonic transmitter of the invention has a transmitting beamformer which includes a drive signal generator for generating drive signals to be fed into a full-bridge circuit. The drive signals generated by the drive signal generator set second and third switching devices of the full-bridge circuit to an OFF state throughout a period when a first switching device of the full-bridge circuit is in an ON state, the drive signals generated by the drive signal generator set first and fourth switching devices to the OFF state and the second switching device to the ON state throughout a period when the third switching device is in the ON state, and the drive signals generated by the drive signal generator set the second and fourth switching devices to the ON state throughout a period when both of the first and third switching devices are in the OFF state.

When the first and fourth switching devices of the full-bridge circuit are set to the ON state and the second switching device of the full-bridge circuit is set to the OFF state, the first and fourth switching devices of the full-bridge circuit and a relevant vibrating element together constitute a closed loop. In this case, a driving pulse signal having a specific voltage (or amplitude) and a pulselength corresponding to the duration of the ON state of the first and fourth switching devices is supplied to the vibrating element throughout the period of time during which the aforementioned condition (the first and fourth switching devices are set to the ON state and the second switching device is set to the OFF state) is maintained. Also, when the second and third switching devices are set to the ON state and the fourth switching device is set to the OFF state, the second and third switching devices and the vibrating element together constitute a closed loop. In this case, a driving pulse signal having a specific voltage (or amplitude) and a pulselength corresponding to the duration of the ON state of the second and third switching devices is supplied to the vibrating element throughout the period of time during which the aforementioned condition (the second and third switching devices are set to the ON state and the fourth switching device is set to the OFF state) is maintained. In this case, timing at which the third switching device turns to the ON state is offset from timing at which the first switching device turns to the ON state by half the period of resonance of the vibrating element caused by the driving pulse signal supplied thereto. On the other hand, when the first and third switching devices are set to the OFF state and the second and fourth switching devices are set to the ON state, the second and fourth switching devices and the vibrating element together constitute a low-impedance closed loop resonant circuit throughout the period of time during which the aforementioned condition (the first and third switching devices are set to the OFF state and the second and fourth switching devices are set to the ON state) is maintained.

Like the ultrasonic transmitter employing the half-bridge circuit, the ultrasonic transmitter employing the full-bridge circuit makes it possible to continuously transmit ultrasonic signals by repetitively causing resonance of each vibrating element and maintaining consequent vibration thereof in the aforementioned manner.

According to the invention, an ultrasonic transceiver includes the aforementioned ultrasonic transmitter and a receiving beamformer for producing an ultrasonic receiving beam by controlling signals produced from ultrasonic waves received by the multiple vibrating elements of the transducer.

The ultrasonic transceiver thus constructed forms an ultrasonic transmitting beam which is transmitted underwater from the multiple vibrating elements of the transducer during each successive transmit cycle and receives echo signals returned from underwater objects through the vibrating elements during each successive receive cycle. The ultrasonic transceiver forms a receiving beam which is successively oriented (steered) in desired directions by using phased array technique.

According to the invention, a sounding apparatus includes the aforementioned ultrasonic transceiver and a device for controlling the receiving beamformer of the ultrasonic transceiver to scan successive sounding directions within the transmitting beam and pick up echo signals from the individual sounding directions and for displaying detected echo data obtained from the echo signals.

The aforementioned ultrasonic transmitter of the invention includes a driver circuit for generating driving pulse signals used for causing the vibrating elements to vibrate, the driver circuit being formed essentially of a half-bridge circuit including two switching devices or of a full-bridge circuit including four switching devices. The present invention makes it possible to configure a highly efficient transmitting beamformer featuring a simple structure that can reliably control the amplitude of emitted ultrasonic signals by controlling the switching devices of the bridge circuit.

In addition, the invention provides a sounding apparatus which can successively scan desired sounding directions, obtain received echo data derived from a particular search area based on echo signals received from the individual sounding directions, and display the received echo data to enable an operator to accurately recognize a detected echo image for multiple sounding directions substantially at the same point in time. Such a high-performance sounding apparatus can be configured by employing the aforementioned ultrasonic transceiver including the receiving beamformer and the device for controlling the transmitting beam and the receiving beam.

These and other objects, features and advantages of the invention will become more apparent upon reading the following detailed description along with the accompanying drawings.

BRIEF DESCRIPTION OF THE DRAWINGS

FIGS. 9A, 9B, 9C and 9D are a timing chart showing a relationship among drive signals supplied to the half-bridge circuit of FIG. 8 and a driving pulse signal fed into a vibrating element.

DETAILED DESCRIPTION OF THE PREFERRED EMBODIMENTS OF THE INVENTION

First Embodiment

A scanning sonar according to a first embodiment of the invention is now described referring to the appended drawings.

Figure 1:
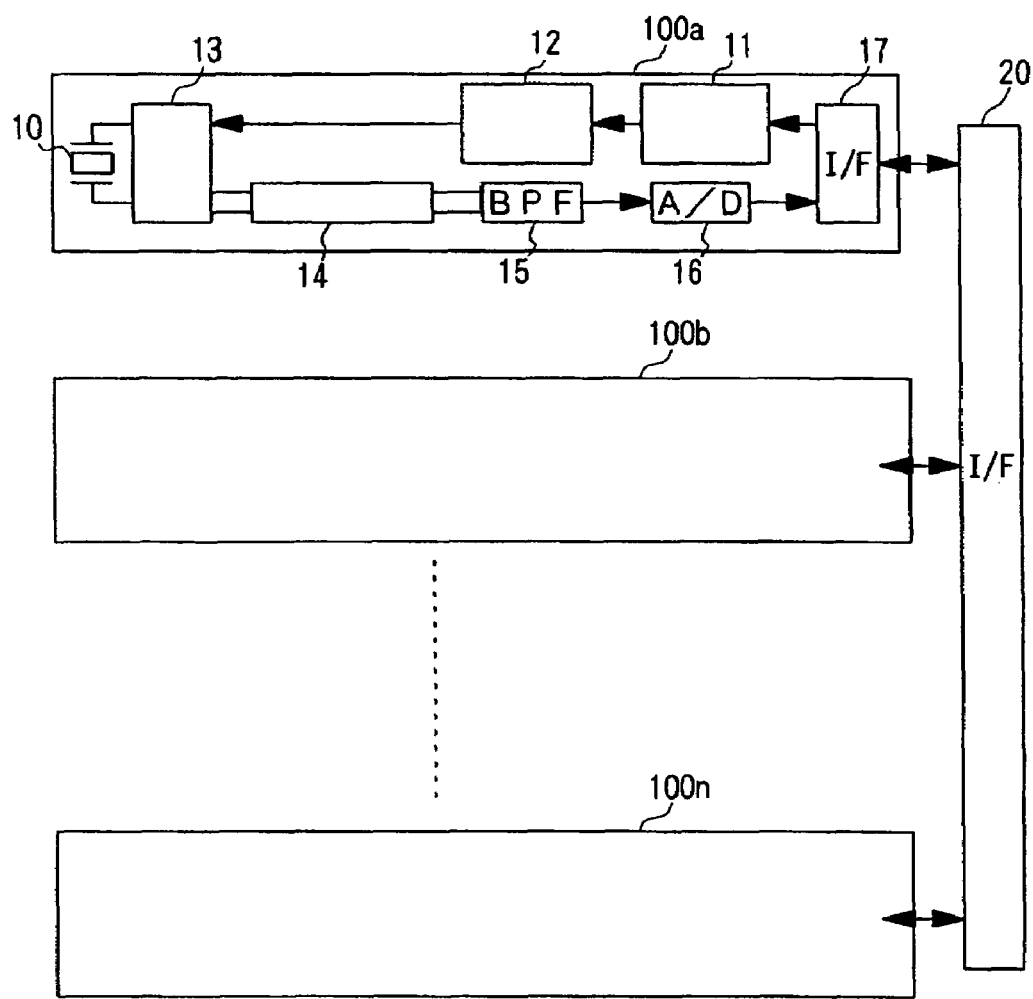
FIG. 1 is a block diagram generally showing the configuration of transmit-receive channels of a scanning sonar according to a preferred embodiment of the invention.

FIG. 1 is a block diagram generally showing the configuration of transmit-receive channels 100 of the scanning sonar according to the first embodiment. Referring to FIG. 1, each of the transmit-receive channels 100 includes a driver interface 11 which generates a drive signal for controlling a driver circuit 12 based on a clock signal and a digital-formatted control signal for controlling switching operation supplied from a later-described programmable transmitting beamformer 26. In this invention, the driver interface 11 and the programmable transmitting beamformer 26 together constitute a drive signal generator. The programmable transmitting beamformer 26 includes a waveform memory 24 which stores multiple patterns of control signals corresponding to ultrasonic signals having different amplitudes. When the amplitude of an ultrasonic signal to be radiated is determined, the control signal corresponding to that amplitude is entered into the driver interface 11.

Figure 2:
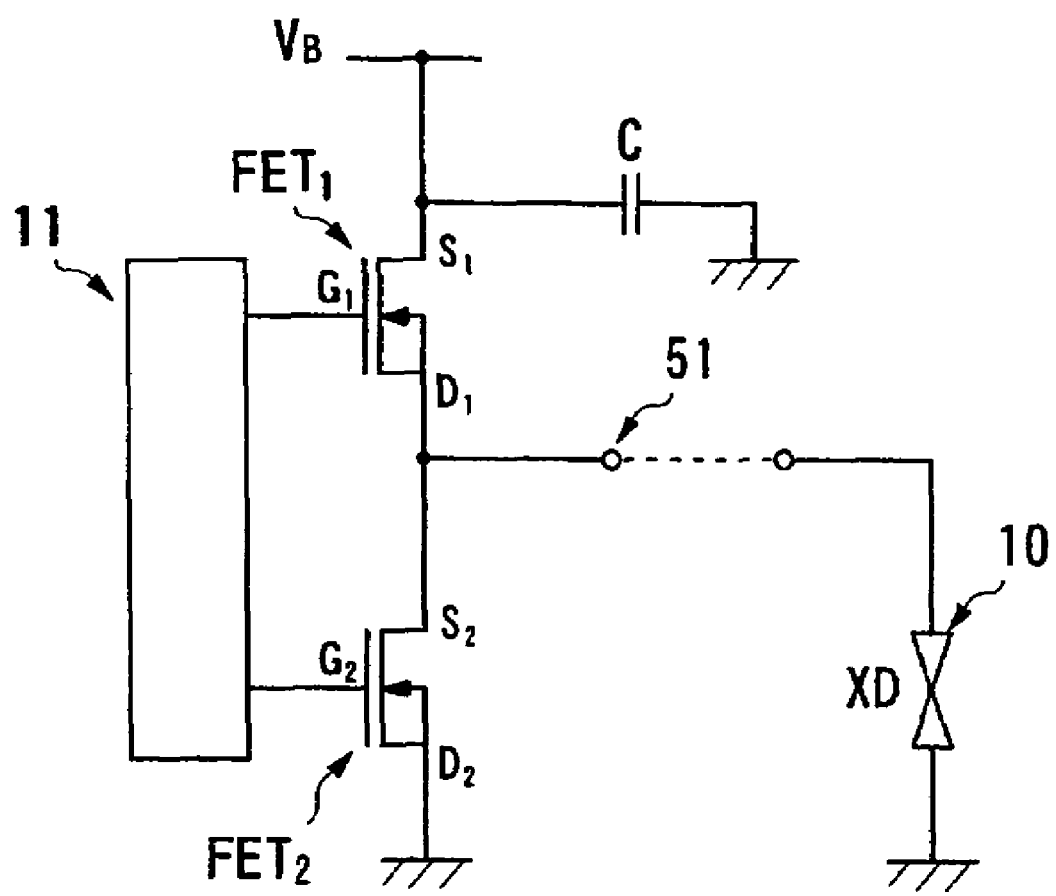
FIG. 2 is a general circuit diagram of a half-bridge circuit included in a driver circuit of each transmit-receive channel of FIG. 1.

FIG. 2 is a general circuit diagram of a half-bridge circuit included in the driver circuit 12 of each transmit-receive channel 100 of FIG. 1.

Figure 4:
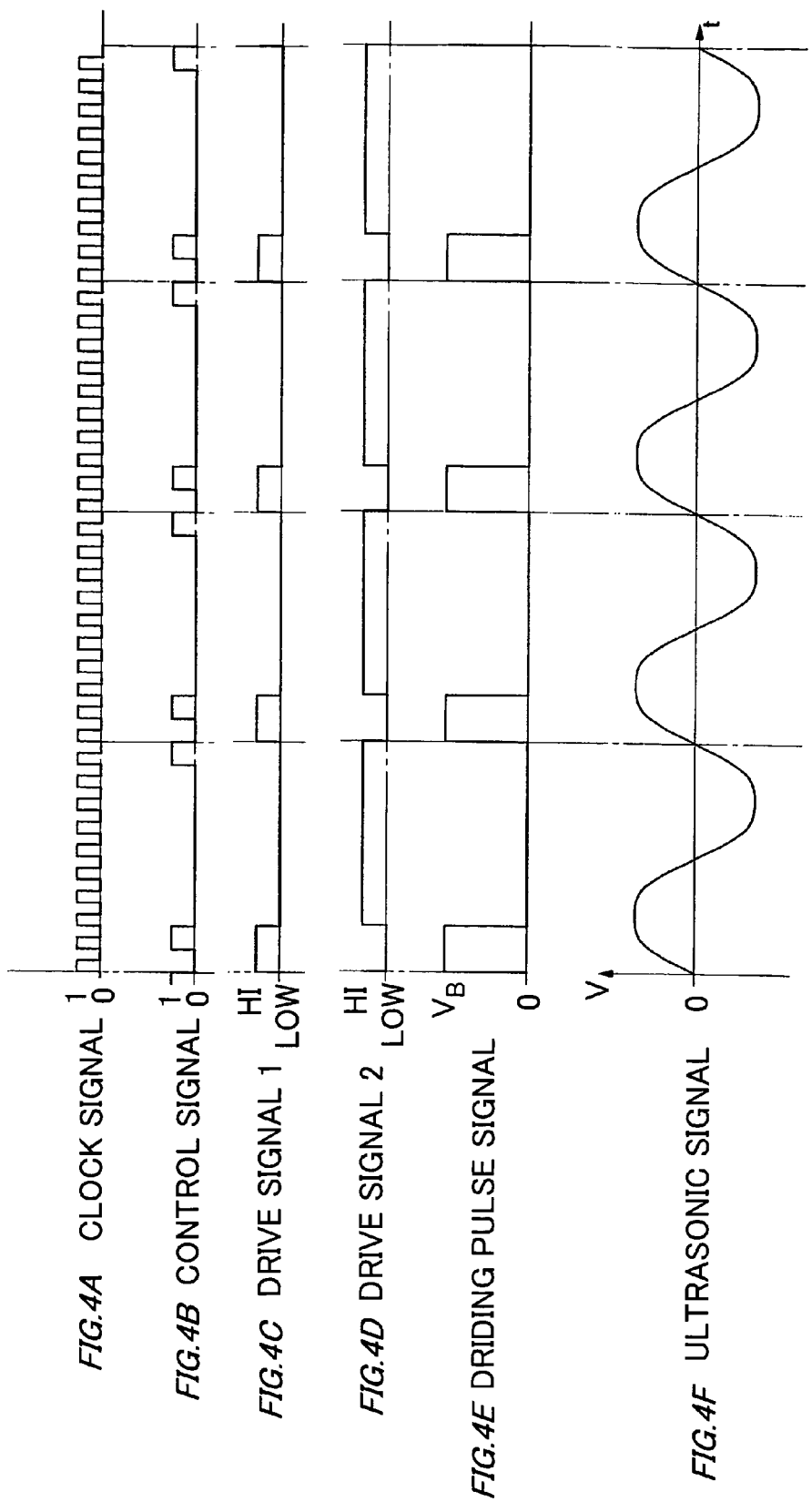
FIGS. 4A, 4B, 4C, 4D, 4E and 4F are a timing chart showing a relationship among a clock signal, a control signal, drive signals, a driving pulse signal and an ultrasonic signal appearing when a half-bridge circuit is used.
Figure 5:
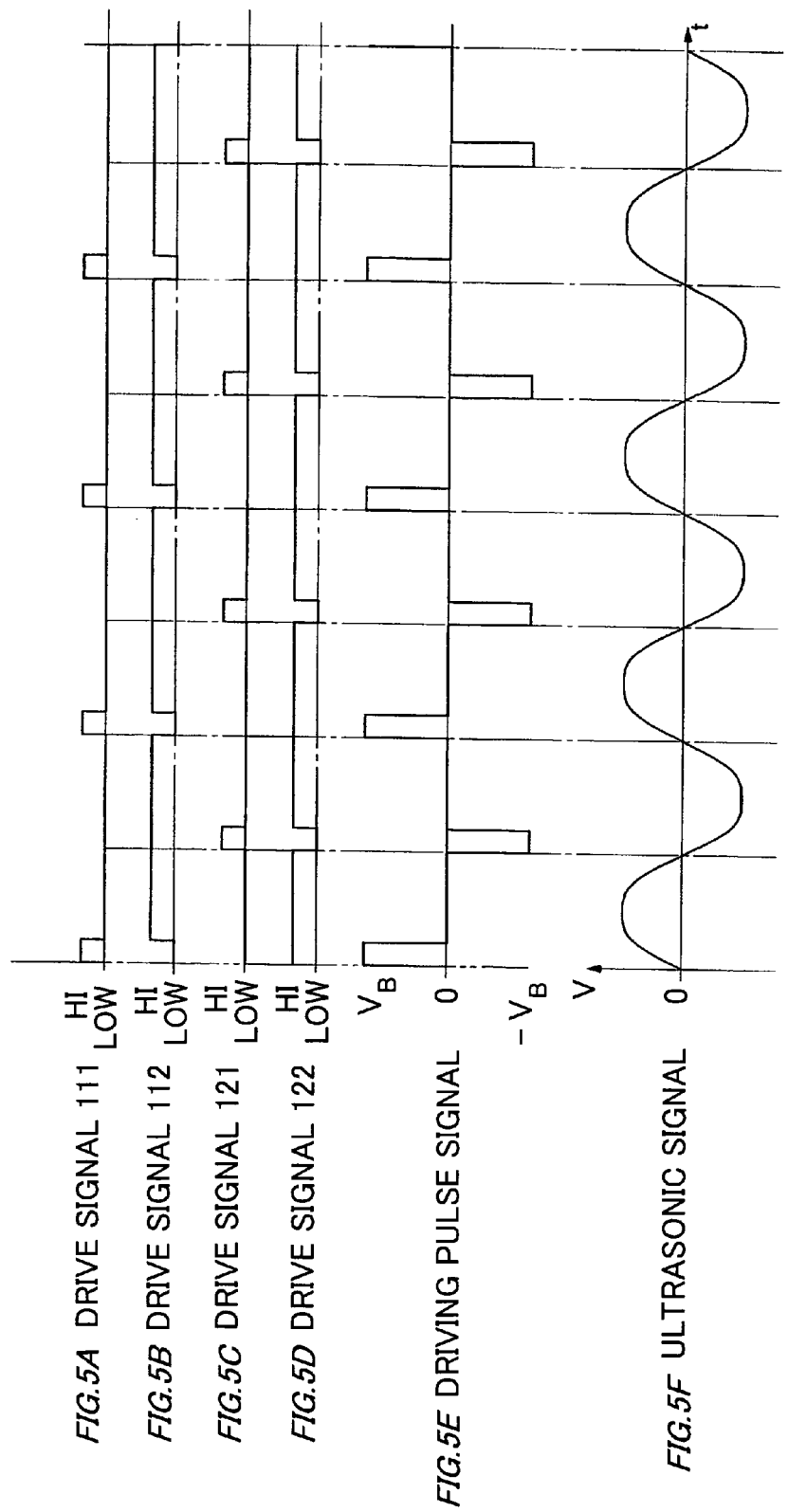
FIGS. 5A, 5B, 5C, 5D, 5E and 5F are a timing chart showing a relationship among drive signals, a driving pulse signal and an ultrasonic signal appearing when a full-bridge circuit is used.

The half-bridge circuit includes a pair of field effect transistors $FET_1$, $FET_2$ (first and second switching devices referred to in claim 1 of this invention) and a capacitor C which stores electric power to be supplied to a vibrating element 10. The driver interface 11 supplies drive signals 1 and 2 shown in FIGS. 4C and 4D to gates $G_1$ and $G_2$ of the field effect transistors $FET_1$ and $FET_2$, respectively. As depicted in FIG. 2, a drain $D_1$ of the switching device $FET_1$ is connected to a source $S_2$ of the switching device $FET_2$ and serves as an output terminal 51 of the half-bridge circuit. A driving voltage $V_B$ for determining the amplitude of a driving pulse signal fed into the vibrating element 10 to drive it is supplied to a source $S_1$ of the switching device $FET_1$ and a drain $D_2$ of the switching device $FET_2$ is grounded. Also, the gate $G_1$ of the switching device $FET_1$ is grounded through the capacitor C as illustrated. As the drive signals 1 and 2 shown in FIGS. 4C and 4D are entered into the half-bridge circuit thus configured, the half-bridge circuit alternately switches the two field effect transistors $FET_1$, $FET_2$ to output the driving pulse signal shown in FIG. 4E. The driving pulse signal is fed into the vibrating element 10 through a transmit-receive switching circuit 13. When the driving pulse signal is supplied, the vibrating element 10 vibrates at its natural resonant frequency and thereby emits a sine-wave ultrasonic signal underwater.

The transmit-receive switching circuit 13 passes the driving pulse signal output from the driver circuit 12 to the vibrating element 10 during each successive transmit cycle and passes a received echo signal output from the vibrating element 10 to a preamplifier 14 during each successive receive cycle. The preamplifier 14 amplifies the received echo signal and a bandpass filter (BPF) 15 in a succeeding stage removes noise components contained in the received echo signal but existing outside the passband of the bandpass filter 15. An analog-to-digital (A/D) converter 16 samples the echo signal filtered by the bandpass filter 15 at specific sampling intervals and converts sampled signals into a train of digital echo data.

The scanning sonar is provided with a plurality of such transmit-receive channels designated 100a, 100b, ..., 100n as many as the number of the vibrating elements 10 which are arranged on a surface of a transducer having a cylindrical or spherical shape, for instance.

Figure 3:
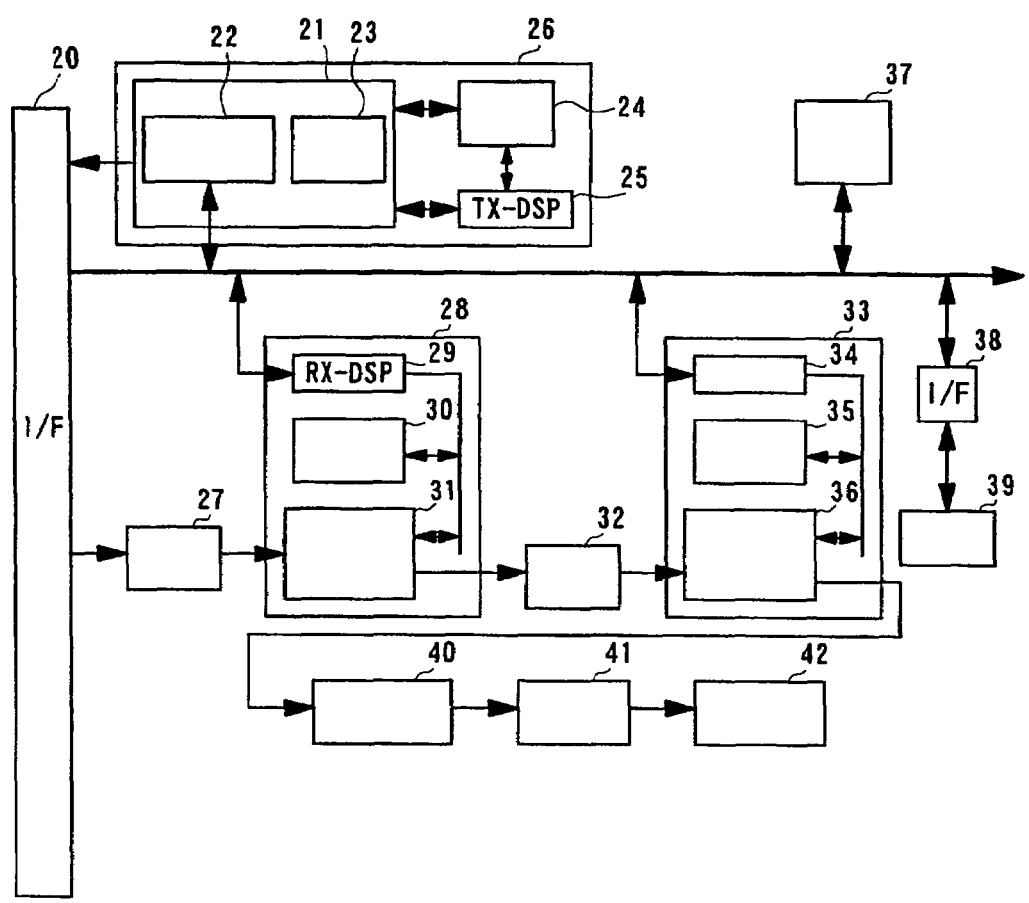
FIG. 3 is a block diagram of a control section for forming a transmitting beam and a receiving beam by using the multiple transmit-receive channels shown in FIG. 1 and for generating a detected echo image derived from a particular search area.

FIG. 3 is a block diagram of a control section for forming a transmitting beam and a receiving beam using the multiple transmit-receive channels 100 shown in FIG. 1 and generating a detected echo image derived from a particular search area. An interface 20 shown in FIG. 3 is identical to that shown in FIG. 1.

The following discussion deals with the configuration of a transmitting system of the scanning sonar.

Referring to FIG. 3, the programmable transmitting beamformer 26 includes a driving signal generating circuit 21, the aforementioned waveform memory 24 and a transmit digital signal processor (DSP) 25. Formed of a field-programmable gate array (FPGA), the driving signal generating circuit 21 incorporates a timing generator 22 and a coefficient table 23. The timing generator 22 generates a signal which gives timing of generating driving pulse signals. The coefficient table 23 stores coefficients necessary for the transmit DSP 25 to perform calculations. As stated earlier, the waveform memory 24 stores multiple patterns of control signals made up of binary values "0" and "1". The transmit DSP 25 reads out one of the control signals from the waveform memory 24 and generates a control signal defining the amounts of time delays to be introduced into the transmit-receive channels 100 of the individual vibrating elements 10. Also, the transmit DSP 25 calculates and updates data content of the coefficient table 23 during each successive transmit cycle.

The driving signal generating circuit 21 outputs the control signal generated by the transmit DSP 25 with the timing given by the timing generator 22 together with the clock signal through the interface 20.

A combination of the programmable transmitting beamformer 26 and the multiple vibrating elements 10 together constitute a transmitting beamformer.

Described in the following is how various signals are generated at individual points in the aforementioned transmitting system and in the transmit-receive channels 100.

FIGS. 4A-4F are a timing chart showing a relationship among the clock signal, the control signal, the drive signals 1, 2, the driving pulse signal and the ultrasonic signal.

The programmable transmitting beamformer 26 generates the clock signal formed of rectangular-shaped pulses (FIG. 4A) which gives timing of generating the clock signal and the control signal for generating the drive signals 1, 2 as stated above. The control signal is a binary-valued signal made up of the binary values "0" and "1". The programmable transmitting beamformer 26 determines whether to switch the level of the drive signal between a binary "0" and a binary "1" by transmitting this control signal in synchronism with the clock signal.

The driver interface 11 switches the levels of the drive signals 1 and 2 if the value of the control signal is "1" and maintains the current levels of the drive signals 1 and 2 if the value of the control signal is "0". The driver interface 11 generates the drive signal 1 shown in FIG. 4C and the drive signal 2 shown in FIG. 4D and outputs these drive signals 1, 2 to the driver circuit 12. More particularly, the driver interface 11 outputs the drive signal 1 to the switching device $FET_1$ of the half-bridge circuit of the driver circuit 12 and the drive signal 2 the switching device $FET_2$ of the half-bridge circuit of the driver circuit 12.

In the half-bridge circuit of the driver circuit 12, the switching device $FET_1$ turns to an ON state and the switching device $FET_2$ turns to an OFF state when the drive signals 1 and 2 go into High and Low states, respectively. As the drive signals 1 and 2 are switched to the Low and High states, respectively, after a lapse of a specific period of time, the switching devices $FET_1$ and $FET_2$ turn to the OFF and ON states, respectively. In this case, a pulse signal of which level is equal the driving voltage $V_B$ flows for a duration corresponding to a specific pulselength from the source $S_1$ of the switching device $FET_1$ through the drain $D_1$ thereof, and as a result, the driver circuit 12 generates the driving pulse signal of which example is shown in FIG. 4E. When the driving pulse signal is fed into the vibrating element 10, the vibrating element 10 begins to resonate, or vibrate, at its natural resonant frequency at a leading edge of the driving pulse signal.

Even when the switching device $FET_1$ is in the OFF state, the switching device $FET_2$ and the vibrating element 10 together form a low-impedance circuit when the switching device $FET_2$ is set to the ON state. In this case, vibration of the vibrating element 10 due to its resonance is not greatly attenuated and the vibrating element 10 continue to vibrate.

Further, the resonant frequency of the vibrating element 10 is matched with the frequency of the drive signals 1, 2 so that timing at which the switching device FET1 turns to the ON state matches timing at which the instantaneous level of the ultrasonic signal emitted from the vibrating element 10 (FIG. 4F) turns from a negative value to a positive value. As the frequency of the drive signals 1, 2 is matched with the resonant frequency of the vibrating element 10 in this fashion, attenuation with time of free vibration of the vibrating element 10 is made up for. This allows the vibrating element 10 to continuously vibrate at a specific frequency and emit the ultrasonic signal depicted in FIG. 4F.

When the vibrating element 10 is caused to vibrate by the driving pulse signal as described above, the duration of ON time of the driving pulse signal is positively correlated with the amplitude of the emitted ultrasonic signal if the duration of ON time of the driving pulse signal is smaller than one-half the period of the ultrasonic signal. Accordingly, the amplitude of the emitted ultrasonic signal is controlled by adjusting the ON time of the driving pulse signal. It is therefore possible to cause the vibrating element 10 to resonate in a stable fashion regardless of the duration of the ON time of the driving pulse signal by using the aforementioned circuit configuration. In short, the circuit configuration of the embodiment makes it possible to easily control the amplitude of the emitted ultrasonic signal.

As thus far explained, the aforementioned circuit configuration enables the vibrating element 10 to emit the ultrasonic signal with least attenuation of free vibration by using the half-bridge circuit having a simple structure. Therefore, the present embodiment makes it possible to configure a highly efficient transmitting beamformer featuring a simple structure that can reliably control the amplitude of the emitted ultrasonic signal, as well as an ultrasonic transmitter employing such a transmitting beamformer.

Now, the following discussion deals with the configuration of a receiving system of the scanning sonar.

Referring again to FIG. 3, a buffer memory 27 is a memory for temporarily storing received echo data fed from the individual channels 100 through the interface 20. Designated by the numeral 28 is a programmable receiving beamformer which includes a receive DSP 29, a coefficient table 30 and a receiving beamforming processor 31. The receive DSP 29 calculates phases of echo signals received by the individual vibrating elements 10 as well as weight values to be assigned to the vibrating elements 10 for each direction of the receiving beam and writes these parameters in the coefficient table 30. The receiving beamforming processor 31 synthesizes the echo signals received by the individual vibrating elements 10 by applying the phases and weights written in the coefficient table 30 to obtain a synthesized received echo signal. The receiving beamforming processor 31 generates this synthesized received echo signal as time series data for each direction of the receiving beam and writes this data in a buffer memory 32. The receiving beamforming processor 31 is formed of an FPGA.

Designated by the numeral 33 is a programmable filter which includes a filtering DSP 34, a coefficient table 35 and a filtering processor 36. The filtering processor 36 is formed of an FPGA. The filtering DSP 34 calculates a filter coefficient for obtaining specific bandpass filter characteristics for each direction of the receiving beam and writes filter coefficients so obtained in the coefficient table 35. The filtering processor 36 performs a mathematical operation as a finite impulse response (FIR) filter based on the filter coefficients stored in the coefficient table 35 and produces passband-corrected echo signals.

An envelope detector 40 detects an envelope of the passband-corrected echo signal derived from each direction of the receiving beam. An image processor 41 converts received echo signal intensities at individual distances in each direction of the receiving beam into image information and outputs this image information to a display 42. As a consequence, the display 42 presents a detected echo image of a specific search area on-screen.

An operating panel 39 is an input terminal for entering commands for setting the search area and other parameters as appropriate. A host central processing unit (CPU) 37 reads the commands entered through the operating panel 39 via an interface 38 and controls individual circuit elements described above accordingly.

By configuring the driver circuit 12 as described above, it is possible to manufacture a low-loss ultrasonic transceiver using conventional constituent components as well as a sounding apparatus employing such an ultrasonic transceiver.

Second Embodiment

An ultrasonic transceiver according to a second embodiment of the invention is now described referring to the appended drawings.

Figure 6:
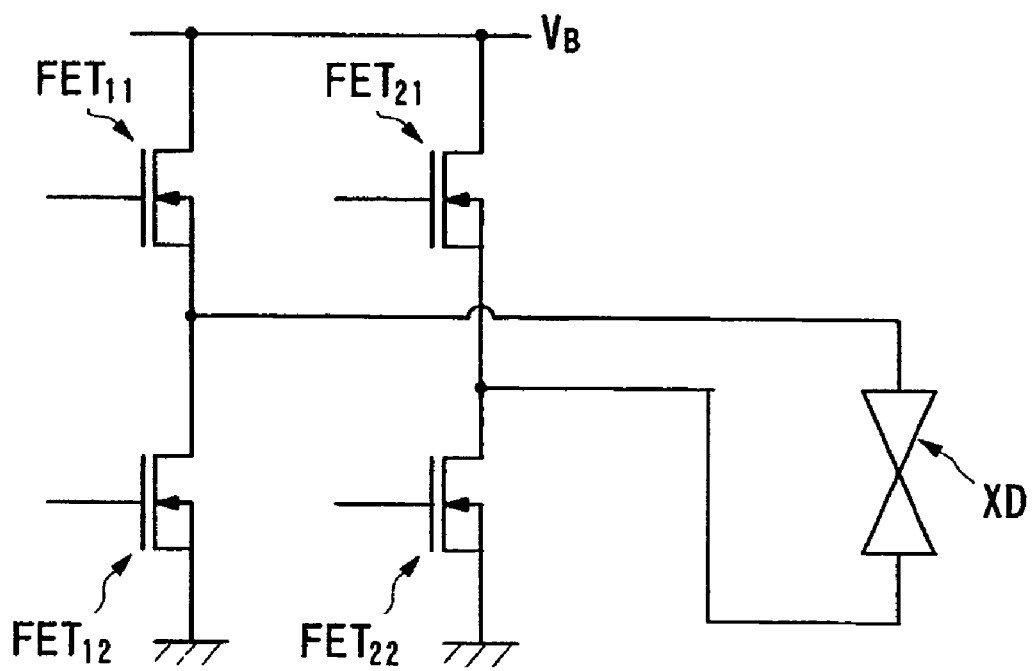
FIG. 6 is a general circuit diagram showing the configuration of a conventional full-bridge circuit.
Figure 7:
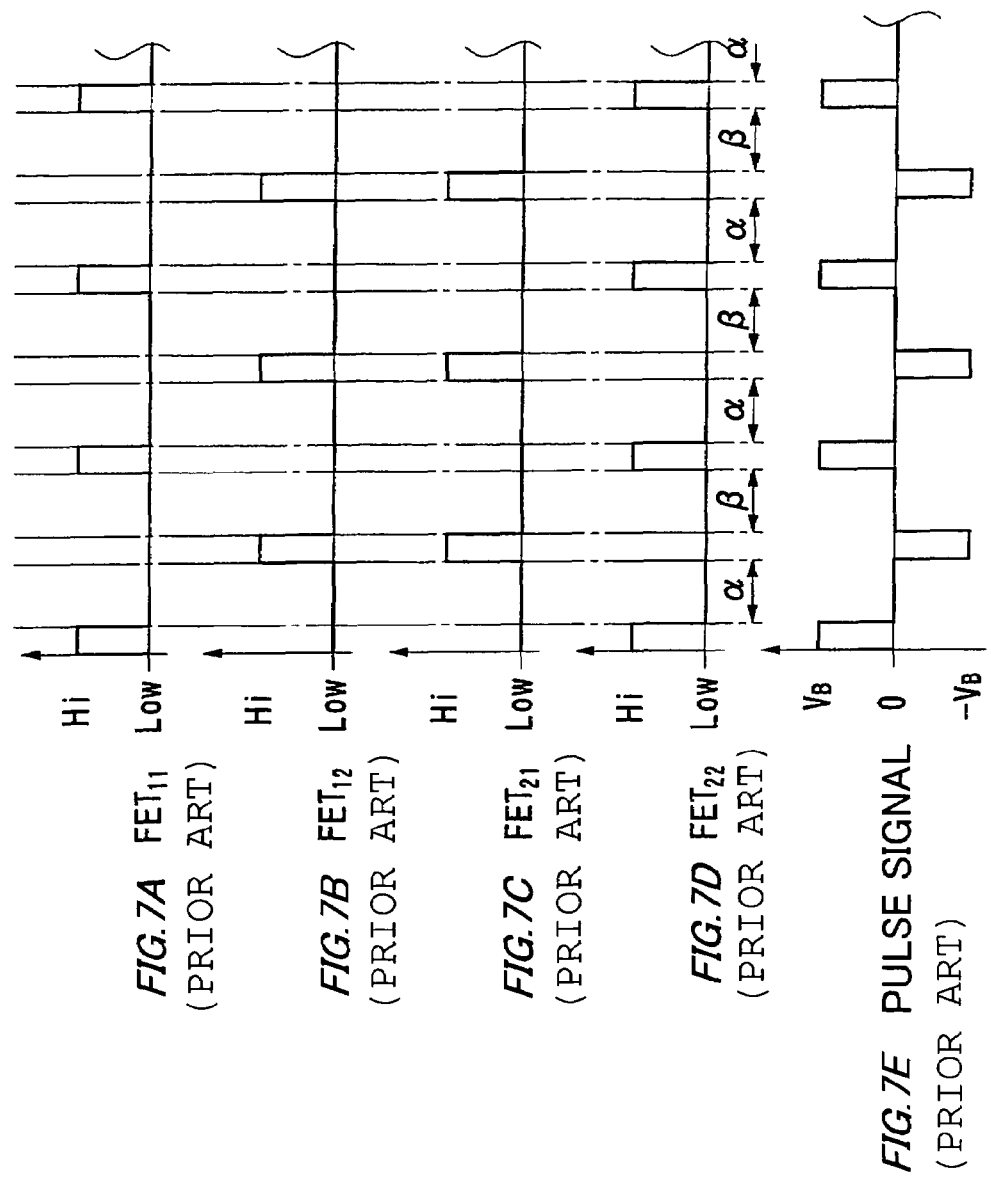
FIGS. 7A, 7B, 7C, 7D and 7E are a timing chart showing a relationship among drive signals supplied to the full-bridge circuit of FIG. 6 and a driving pulse signal fed into a vibrating element.
Figure 8:
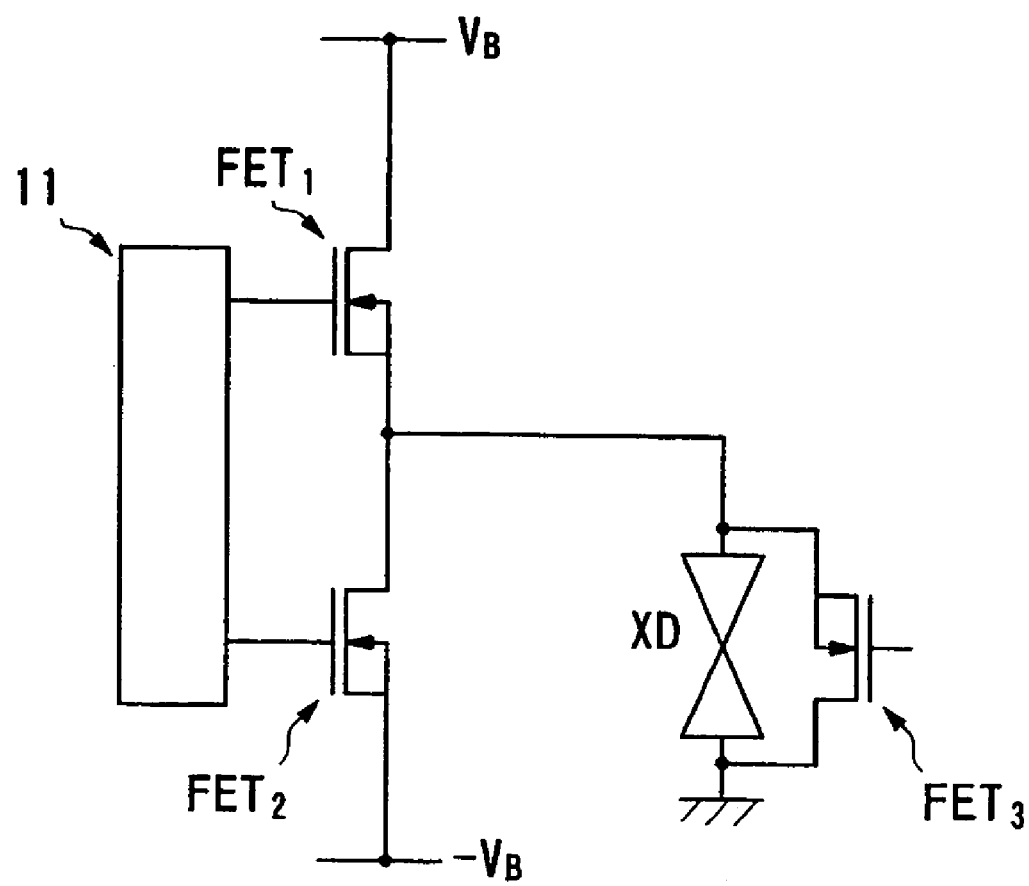
FIG. 8 is a general circuit diagram showing the configuration of a conventional half-bridge circuit.
Figure 10A:
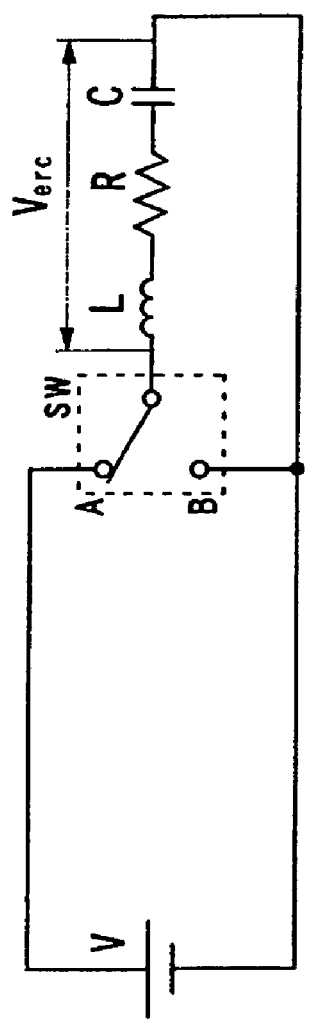
FIGS. 10A and 10B are an equivalent circuit of a closed loop formed by the vibrating element and the half-bridge circuit of the invention and a diagram showing a waveform of a naturally damped oscillation occurring in the closed loop, respectively.
Figure 10B:
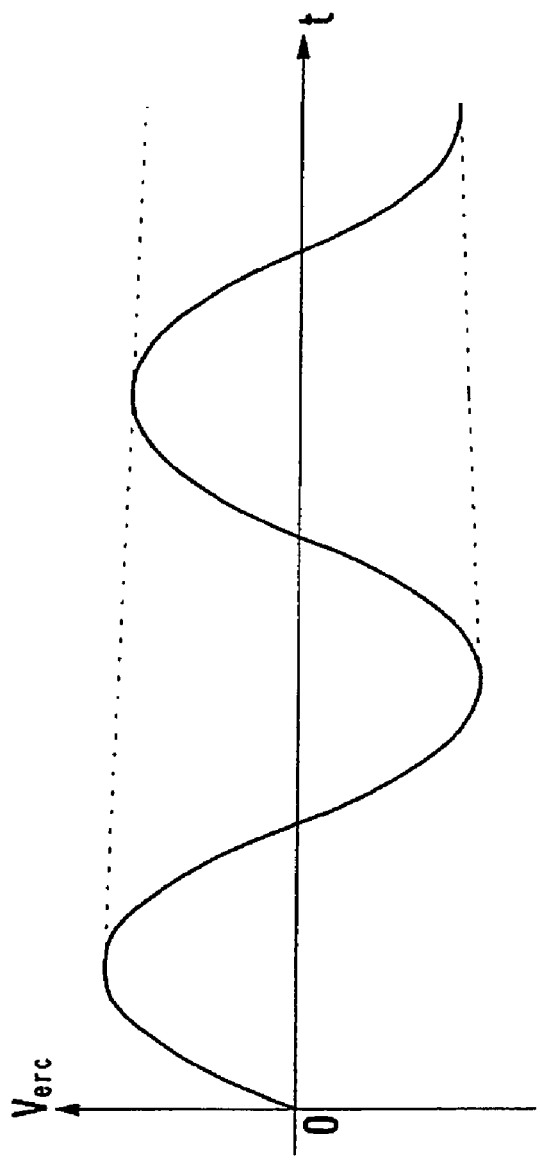

The ultrasonic transceiver of this embodiment is characterized by employing the same driver circuit 12 as shown in FIG. 1 combined with a full-bridge circuit shown in FIG. 6, which is conventional, to input drive signals 111, 112, 121 and 122 shown in FIGS. 5A-5D. The ultrasonic transceiver of this embodiment has otherwise the same construction as that of the first embodiment, so that part of the ultrasonic transceiver of the second embodiment identical to that of the first embodiment is not rediscussed in the following.

Switching devices $FET_{11}$, $FET_{12}$, $FET_{21}$, $FET_{22}$ of the full-bridge circuit shown in FIG. 6 correspond, respectively, to first to fourth switching devices recited in claim 2 of the invention.

The driver circuit 12 of each transmit-receive channel 100 incorporates the full-bridge circuit including four FETs as shown in FIG. 6. The drive signals 111, 112, 121 and 122 shown in FIGS. 5A-5D are input to the switching devices $FET_{11}$, $FET_{12}$, $FET_{21}$ and $FET_{22}$, respectively.

When the drive signals 111 and 122 are in a High state and the drive signals 112 and 121 are in a Low state, the switching devices $FET_{11}$ and $FET_{22}$ turn to an ON state and the switching devices $FET_{12}$ and $FET_{21}$ turn to an OFF state in the aforementioned full-bridge circuit. Then, after a lapse of a specific period of time, the drive signal 111 goes into the Low state and the drive signal 112 goes into the High state. Consequently, the switching device $FET_{11}$ turns to the OFF state and the switching device $FET_{22}$ turns to the ON state. As a result, a pulse signal of which pulselength corresponds to the period of time during which the switching device $FET_{11}$ was on the ON state is fed into the vibrating element 10. When this pulse signal is entered, the vibrating element 10 resonates, or vibrates, at its natural resonant frequency and transmits an ultrasonic signal. Subsequently, only the switching devices $FET_{11}$ and $FET_{22}$ remain in the ON state until the switching device $FET_{21}$ turns to the ON state and the switching device $FET_{22}$ turns to the OFF state, so that the switching devices $FET_{11}$ and $FET_{22}$ and the vibrating element 10 together form a low-impedance circuit. It is therefore possible to minimize attenuation of vibration of the vibrating element 10 caused by its oscillation due to the ON state of the switching device $FET_{11}$.

Next, the switching device $FET_{21}$ turns to the ON state for a specific period of time so that a pulse signal of which pulselength corresponds to the duration of the ON state of the switching device $FET_{21}$ is fed into the vibrating element 10, thereby causing the vibrating element 10 to vibrates at its natural resonant frequency. Subsequently, only the switching devices $FET_{12}$ and $FET_{22}$ remain in the ON state until the switching device $FET_{11}$ turns to the ON state and the switching device $FET_{12}$ turns to the OFF state, so that the switching devices $FET_{12}$ and $FET_{22}$ and the vibrating element 10 together form a low-impedance circuit. It is therefore possible to minimize attenuation of vibration of the vibrating element 10 caused by its oscillation due to the ON state of the switching device $FET_{21}$.

The aforementioned circuit configuration of the present embodiment makes it possible to compensate for the amount of attenuation of continuous vibration of the vibrating element 10 by offsetting timing at which the switching device $FET_{21}$ turns to the ON state from timing at which the switching device $FET_{11}$ turns to the ON state by half the period of resonance of the vibrating element 10, so that resonance caused by the switching device $FET_{11}$ and resonance caused by the switching device $FET_{21}$ synchronize with each other. It is therefore possible to cause the vibrating element 10 to continuously transmit the ultrasonic signal in a stable fashion.

It is possible to output the ultrasonic signal with least attenuation of vibration of the vibrating element 10 by using the aforementioned full-bridge circuit of the embodiment as well. This makes it possible to configure a highly efficient transmitting beamformer which can reliably control the amplitude of the emitted ultrasonic signal, as well as an ultrasonic transmitter employing such a transmitting beamformer.

While the foregoing discussion of the first and second embodiments has illustrated a method of driving the vibrating elements 10 by using the driving pulse signal having the same period as that of the ultrasonic signal, the vibrating elements 10 may be driven by a driving pulse signal having a shorter period than the emitted ultrasonic signal. In this case, the amplitude of the ultrasonic signal emitted from each vibrating element 10 is controlled by an on-duty ratio which is the ratio of the sum of time durations of multiple pulses generated during one-half the period of the driving pulse signal at the resonant frequency of the vibrating element 10 to one-half the period of the driving pulse signal of the vibrating element 10. The invention is applicable even by using the above-described method of driving the vibrating elements 10. The same advantageous effect is obtained from this alternative method of driving the vibrating elements 10 as from the earlier-mentioned method of driving the vibrating elements 10.

What is claimed is:

1. An ultrasonic transmitter comprising:
a plurality of vibrating elements driven by specific pulse signals, the vibrating elements being arranged on the surface of a transducer; and
a transmitting beamformer for forming an ultrasonic transmitting beam by activating individual vibrating elements by feeding the pulse signals thereto, the transmitting beamformer including:
a bridge circuit including at least first and second switching devices connected in series between a ground potential and a driving voltage which determines the amplitude of each pulse signal, wherein the bridge circuit generates the pulse signal based on drive signals fed into the individual switching devices; and
a drive signal generator means for generating the drive signals to set the first and second switching devices of the bridge circuit ON and Off, the drive signal generator generating the drive signals to set the second switching device of the bridge circuit to an OFF state throughout a period when the first switching device of the bridge circuit is in an ON state, and forming a low impedance closed loop resonant circuit of the second switching device and the vibrating element by generating the drive signals to set the second switching device to the ON state throughout a period when the first switching device is in the OFF state.

2. An ultrasonic transceiver comprising:
the ultrasonic transmitter according to claim 1; and
a receiving beamformer for producing an ultrasonic receiving beam by controlling signals produced from ultrasonic waves received by a plurality of vibrating elements of the transducer.

3. A sounding apparatus comprising:
the ultrasonic transceiver according to claim 2; and a device for controlling the receiving beamformer to scan successive azimuthal directions within the transmitting beam and pick up echo signals from the individual directions and for displaying detected echo data obtained from the echo signals.

4. The ultrasonic transmitter according to claim 1, wherein the bridge circuit further includes third and fourth switching devices connected in series and parallel to the first and second switching devices, the series connected third and fourth switching devices are also connected between the ground potential and the driving voltage, which determines the amplitude of each pulse signal, wherein the circuit generates the pulse signal based on the drive signals fed into the individual switching devices, and wherein the drive signal generator means generates drive signals to set the second and third switching devices of the bridge circuit to an OFF state throughout a period when the first switching device of the bridge circuit is in an ON state, to set the first and fourth switching devices to the OFF state and the second switching device to the ON state throughout a period when the third switching device is in the ON state, and to set the second and fourth switching devices to the ON state throughout a period when both of the first and third switching devices are in the OFF state.

5. An ultrasonic transmitter comprising:

a vibrating element driven by a pulse signal; and a bridge circuit including at least first and second switching devices connected in series between a ground potential and a driving voltage which determines the amplitude of the pulse signal, wherein the bridge circuit generates the pulse signal based on drive signals fed into the individual switching devices, with the pulse signal supplied to the vibrating element; and a drive signal generator means for generating the drive signals to set the first and second switching devices of the bridge circuit ON and Off, the drive signal generator generating the drive sianals to set the second switching device of the bridge circuit to an OFF state throughout a period when the first switching device of the bridge circuit is in an ON state, and forming a low impedance closed loop resonant circuit of the second switching device and the vibrating element by generating the drive signals to set the second switching device to the ON state throughout a period when the first switching device is in the OFF state.

6. The ultrasonic transmitter according to claim 5, wherein the bridge circuit further includes third and fourth switching devices connected in senes and parallel to the first and second switching devices, the series connected third and fourth switching devices are also connected between the ground potential and the driving voltage, which determines the amplitude of each pulse signal, wherein the circuit generates the pulse signal based on the drive signals fed into the individual switching devices, and the drive signal generator means generates drive signals to set the second and third switching devices of the bridge circuit to an OFF state throughout a period when the first switching device of the bridge circuit is in an ON state, to set the first and fourth switching devices to the OFF state and the second switching device to the ON state throughout a period when the third switching device is in the ON state, and to set the second and fourth switching devices to the ON state throughout a period when both of the first and third switching devices are in the OFF state.

* * * * *